United States Patent
Kadus et al.

(10) Patent No.: US 9,784,454 B2
(45) Date of Patent: Oct. 10, 2017

(54) COOKTOP BURNER MOUNTING SYSTEM

(71) Applicant: Whirlpool Corporation, Benton Harbor, MI (US)

(72) Inventors: Sachin Kadus, Pune (IN); Pradeep Kulkarni, Pune (IN); Basavraj Ishwar Sankhgond, Evansville (IN); Arthur P. Silva, Joinville (BR)

(73) Assignee: Whirlpool Corporation, Benton Harbor, MI (US)

( * ) Notice: Subject to any disclaimer, the term of this patent is extended or adjusted under 35 U.S.C. 154(b) by 848 days.

(21) Appl. No.: 13/804,577

(22) Filed: Mar. 14, 2013

(65) Prior Publication Data
US 2014/0261385 A1    Sep. 18, 2014

(51) Int. Cl.
*F24C 3/08* (2006.01)
*F23D 14/06* (2006.01)
*B23P 11/00* (2006.01)

(52) U.S. Cl.
CPC ............... *F24C 3/08* (2013.01); *B23P 11/00* (2013.01); *F23D 14/06* (2013.01); *F24C 3/085* (2013.01); *Y10T 29/49826* (2015.01)

(58) Field of Classification Search
CPC ........ F23D 14/06; F23D 14/46; F23D 21/005; F23D 21/00; F23D 99/00; F23D 2700/02; F23C 5/00; F23C 5/02; F23C 5/06; F23C 5/08; F24C 3/008; F24C 3/027; F24C 3/08; F24C 3/082; F24C 3/085; F24C 3/10; F24C 3/103; F24C 3/106; B23P 11/00; B23P 11/005; Y10T 29/49826; Y10T 29/5165; Y10T 29/5166; Y10T 29/5167

USPC .......... 126/39 A, 39 C, 39 E, 39 R; 239/600, 239/265, 280.5; 431/139, 202, 343; 285/19, 20, 27, 402
See application file for complete search history.

(56) References Cited

U.S. PATENT DOCUMENTS

| | | | |
|---|---|---|---|
| 2,600,656 A | | 6/1952 | Jenson |
| 2,896,704 A | * | 7/1959 | Aleweld ............ 126/39 E |
| 2,991,783 A | | 7/1961 | Saponara |
| 3,082,985 A | * | 3/1963 | Herdman ............ A61J 9/0638 248/103 |
| 4,354,478 A | * | 10/1982 | Contini ............ F24C 3/085 126/39 E |

(Continued)

OTHER PUBLICATIONS

European Patent Application No. 14159755.9, filed Mar. 14, 2014, Applicant: Whirlpool Europe, Srl, European Search Report re: same, mail date: May 23, 2014.

*Primary Examiner* — Avinash Savani
*Assistant Examiner* — Deepak Deean
(74) *Attorney, Agent, or Firm* — Diederiks & Whitelaw, PLC

(57) ABSTRACT

A burner of a gas cooking appliance is mounted through a turn and lock mechanism established between a support member mounted below a cooktop of the appliance and a holder attached to the burner. More specifically, the holder and support member include interengaging structure, allowing the holder to be initially attached to and then twist secured upon the support member. In addition, locating structure is provided to assure the holder is appropriately positioned for proper alignment of the turn and lock mechanism. Furthermore, upon twisting the holder relative to the support member, locking structure retains the holder in a desired, operational position.

16 Claims, 4 Drawing Sheets

(56) References Cited

U.S. PATENT DOCUMENTS

| | | | | |
|---|---|---|---|---|
| 4,537,540 A * | 8/1985 | Boughton | B60P 1/6418 | |
| | | | 108/55.1 | |
| 4,565,523 A * | 1/1986 | Berkelder | F23D 14/065 | |
| | | | 126/39 E | |
| 4,572,154 A | 2/1986 | Schweitzer | | |
| 4,676,221 A * | 6/1987 | Baynes | A47J 37/0713 | |
| | | | 126/39 E | |
| 4,679,544 A * | 7/1987 | Koziol | A47J 37/0682 | |
| | | | 126/25 R | |
| 4,763,778 A * | 8/1988 | Feddersen | B29C 49/4205 | |
| | | | 198/375 | |
| 4,773,384 A * | 9/1988 | Koziol | A47J 37/0682 | |
| | | | 126/39 R | |
| 4,861,264 A * | 8/1989 | Romanak et al. | 431/263 | |
| 5,152,276 A | 10/1992 | Brock et al. | | |
| 5,249,958 A * | 10/1993 | Freber | 431/354 | |
| 5,323,759 A * | 6/1994 | Hammel et al. | 126/39 R | |
| 5,405,263 A * | 4/1995 | Gerdes | F24C 3/085 | |
| | | | 126/39 E | |
| 5,422,487 A * | 6/1995 | Sauska | C02F 1/325 | |
| | | | 250/436 | |
| 5,623,917 A | 4/1997 | Dinaso et al. | | |
| 5,676,539 A | 10/1997 | Draper | | |
| 5,859,410 A | 1/1999 | White et al. | | |
| 5,865,615 A | 2/1999 | Simpson et al. | | |
| 5,924,860 A | 7/1999 | Massey et al. | | |
| 6,032,662 A | 3/2000 | Taplan et al. | | |
| 6,170,479 B1 | 1/2001 | Taplan | | |
| 6,173,708 B1 * | 1/2001 | Arntz et al. | 126/39 R | |
| 6,254,381 B1 * | 7/2001 | Baynham et al. | 431/266 | |
| 6,616,369 B2 * | 9/2003 | Clark | E01F 9/681 | |
| | | | 116/63 R | |
| 6,736,631 B2 | 5/2004 | Ferlin et al. | | |
| 6,817,353 B2 * | 11/2004 | Atkinson et al. | 126/39 E | |
| 6,817,355 B1 * | 11/2004 | Hawkins | F24C 3/085 | |
| | | | 126/214 A | |
| 7,125,159 B2 * | 10/2006 | Hirsch | H01R 33/0809 | |
| | | | 362/222 | |
| 7,927,392 B2 * | 4/2011 | Clements | B01D 46/0021 | |
| | | | 55/341.1 | |
| 2006/0170323 A1 * | 8/2006 | Hirsch | H01J 5/54 | |
| | | | 313/318.01 | |
| 2008/0129179 A1 * | 6/2008 | Peeters et al. | 313/318.07 | |
| 2010/0101198 A1 * | 4/2010 | Phillips | B08B 15/02 | |
| | | | 55/385.2 | |
| 2010/0104992 A1 * | 4/2010 | Padgett | 431/202 | |
| 2011/0290231 A1 | 12/2011 | Padgett | | |
| 2015/0040887 A1 * | 2/2015 | Angulo | F24C 3/08 | |
| | | | 126/39 E | |

* cited by examiner

US 9,784,454 B2

COOKTOP BURNER MOUNTING SYSTEM

BACKGROUND OF THE INVENTION

Field of the Invention

The present invention pertains to the art of cooking and, more particularly, to a mounting assembly employing a turn and lock feature for securing a gas cooktop burner to support structure.

Description of the Related Art

In the art of cooking, both gas and electric cooktops are commonplace. The cooktop can be provided as part of a range or separately mounted in a countertop. In the case of a gas range, a plurality of burners are mounted at spaced locations about a top of the range. In most cases, the burners are mounted in openings formed in the cooktop. In some designs, the burners can actually be sealed to the cooktop to provide a streamlined appearance to facilitate cleaning and maintenance. In other designs, the burners are generally mounted to structure below the cooktop and project through the openings. For instance, it is known to mount a bracket to a burner box below the cooktop and secure a burner, as well as an end portion of a gas supply line, to the bracket, specifically through the use of a plurality of mechanical fasteners. Although effective and reliable, such a mounting arrangement is quite labor intensive in connection with the overall assembly of the cooking appliance. The invention seeks to address this situation by presenting an alternative burner mounting arrangement.

SUMMARY OF THE INVENTION

The present invention is directed to the mounting of a burner in a gas cooking appliance. More specifically, a turn and lock mechanism is employed for mounting a burner to a support member below a cooktop. The turn and lock mechanism is actually established between the support member and a holder attached to the burner. More specifically, the holder and support member include interengaging structure, allowing the holder to be initially attached to and then twist secured upon the support member. In making this connection, locating structure is provided to assure the holder is appropriately positioned for proper alignment of the overall turn and lock mechanism. Furthermore, upon twisting the holder relative to the support member, locking structure retains the holder in a desired, operational position.

In a particular embodiment of the invention, the locating structure is constituted by a locator element which extends into an opening in the support member, with the locator element establishing a rotational axis for the holder. In addition, the turn and lock mechanism includes a pair of spaced, arcuate slots formed in the support member, with each slot having an enlarged diametric portion and a reduced diametric portion. On the other hand, the holder is provided with two spaced projections, such as established by fasteners extending from or molded geometry on the holder. Finally, the locking structure includes a locking member which is received in an opening formed in the support member upon rotation of the holder to the operational position.

Additional objects, features and advantages of the invention will become readily apparent from the following detailed description of preferred embodiments of the invention when taken in conjunction with the drawings wherein like reference numerals refer to corresponding parts in the several views.

DETAILED DESCRIPTION OF PREFERRED EMBODIMENTS

Figure 1:
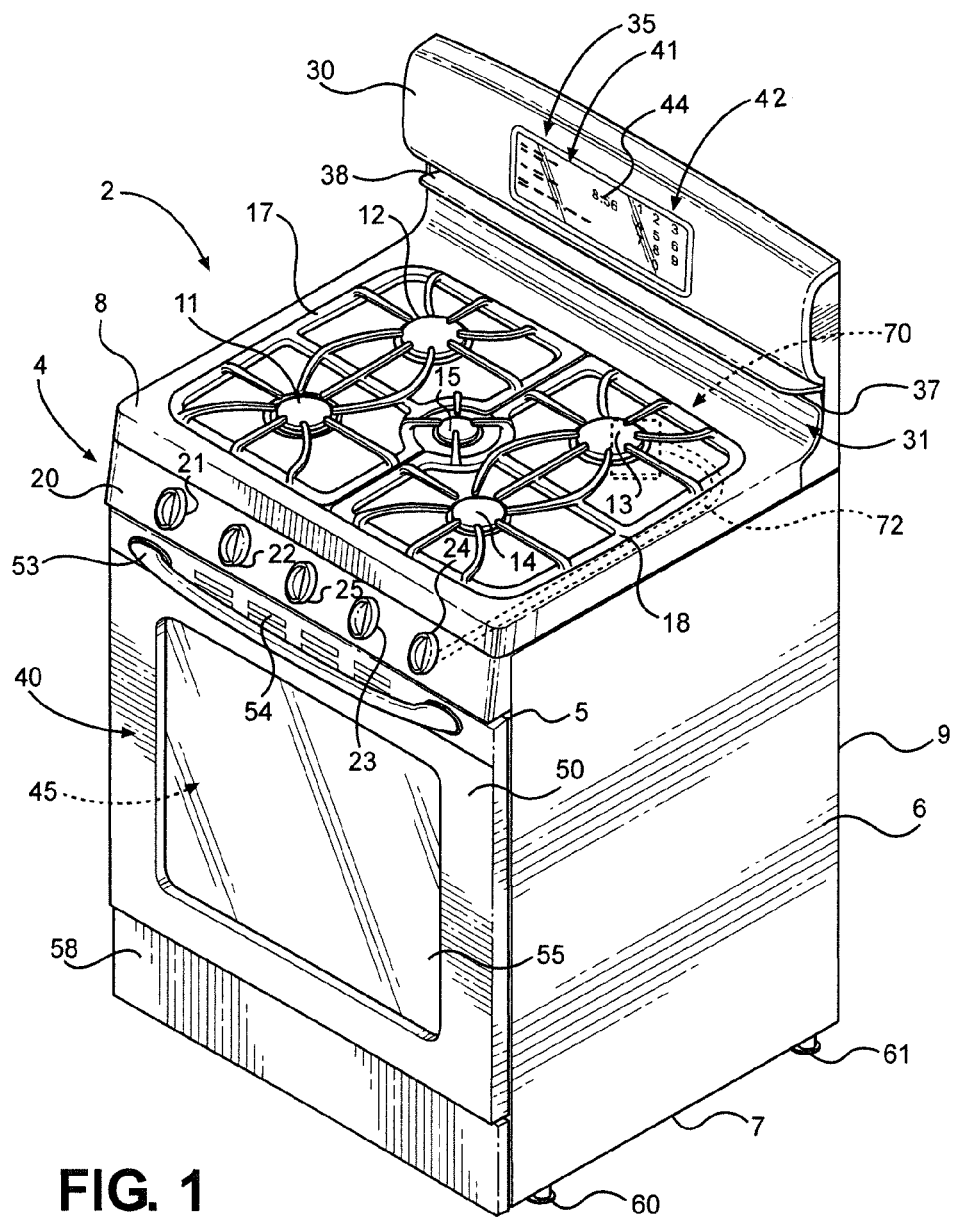
FIG. 1 is a perspective view of a range incorporating the cooktop burner mounting system of the present invention.

With initial reference to FIG. 1, the present invention is shown incorporated into a cooking appliance generally indicated at 2. As illustrated, cooking appliance 2 takes the form of a free-standing gas range. Range 2 includes a cabinet 4 having a front panel portion 5, opposing side panel portions 6, a bottom portion 7, a range top 8 and a main back panel 9. Within the scope of the invention, range top 8 can take on various forms. In the preferred embodiment shown, range top 8 is provided with five gas burner elements 11-15, i.e., four outer quadrant gas burner elements 11-14 and a central gas burner element 15, which are covered by left and right, mirror image burner grates 17 and 18.

In the embodiment illustrated, cabinet 4 further includes a front control surface 20 supporting a plurality of control knobs 21-25 for controlling the activation/de-activation of gas burners 11-15 respectively. Furthermore, cabinet 4 includes an upstanding control panel 30 arranged at an upper rear portion 31 of cabinet 4. In the embodiment shown, control panel 30 includes a central control and display unit, generally indicated at 35. Control panel 30 is provided above an exhaust outlet opening 37 extending across upper rear portion 31 and having an associated exhaust deflector 38 for directing an exhaust airflow away from control panel 30 and central control and display 35.

In the exemplary embodiment shown, central control and display 35 is provided for use in controlling an oven 40 of range 2. Although not fully detailed in this figure, control and display unit 35 includes a first control section 41 for selecting a desired cooking operation for oven 40. By way of example, control and display unit 35 could enable a user to select between warm, convection bake, bake, convection broil, broil and cleaning operations. In connection with setting desired cooking parameters, control and display unit 35 also includes a second control section 42 which defines a numeric key pad. At this point, it should be realized that the arrangement and features associated with control panel 30 can vary without departing from the invention. For instance, in addition to other standard controls, such as timer and clock setting elements, control panel 30 can provide for other operations known in the art. In any event, control and display unit 35 further includes a central display 44 for conveying information to and verifying input/operational parameters to a user.

As depicted, oven 40 includes an oven cavity 45 and has associated therewith a door 50 which can be pivoted by means of a handle 53. Door 50 preferably includes a plurality of vents 54 arranged behind handle 53 and a window 55 for viewing the contents of oven cavity 45 when door 50 is closed. Arranged below door 50 and extending across cabinet 4 is a lower face panel 58.

In a manner known in the art, range 2 is adapted to be mounted upon a supporting surface, such as a kitchen floor or the like. More specifically, a plurality of leg members, two of which are indicated in FIG. 1 at 60 and 61, extend from bottom portion 7 at front and rear portions of cabinet 4, along side panel 6. Of course, corresponding leg members 60 and 61 are also provided on the opposing side of range 2. In any event, the various leg members 60 and 61 are preferably vertically adjustable to also act as levelers for range 2. Such leg leveler arrangements are widely known in the art of appliances, including ranges, dishwashers and refrigerators. At this point, it should be noted that the above-referenced structure is known in the art and has been shown and described for the sake of completeness. Instead, the invention is actually directed to a mounting system for one or more of burners 11-15 for cooktop 8, particularly a mounting system including a turn and lock mechanism generally indicated at 70 for securing both burner 13 and a gas supply line 72 regulated through control knob 24 as will be more fully discussed below.

Figure 2:
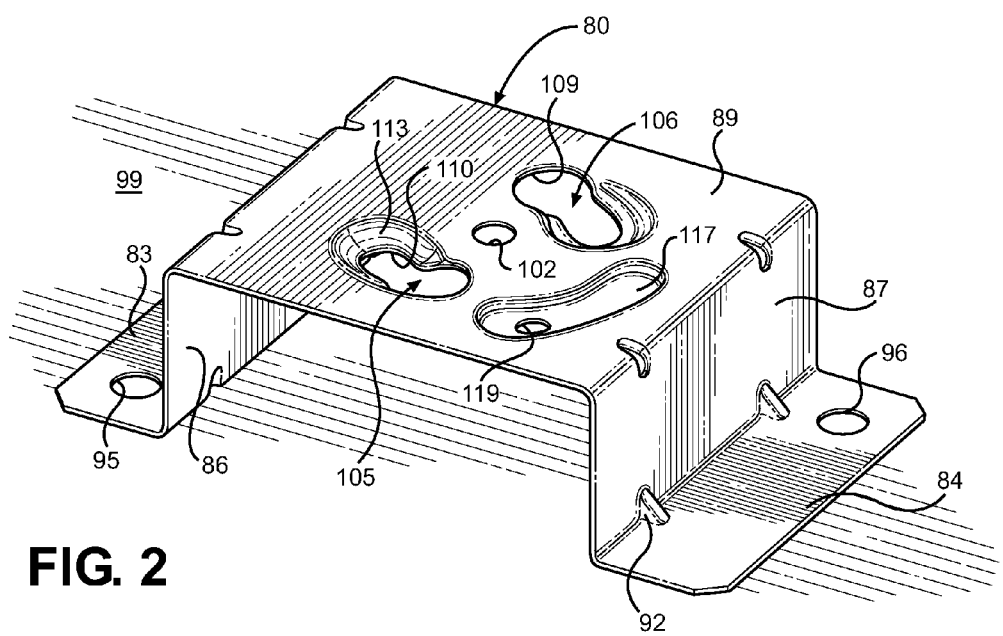
FIG. 2 is a perspective view of a bracket forming support structure of the mounting system of FIG. 1.
Figure 3:
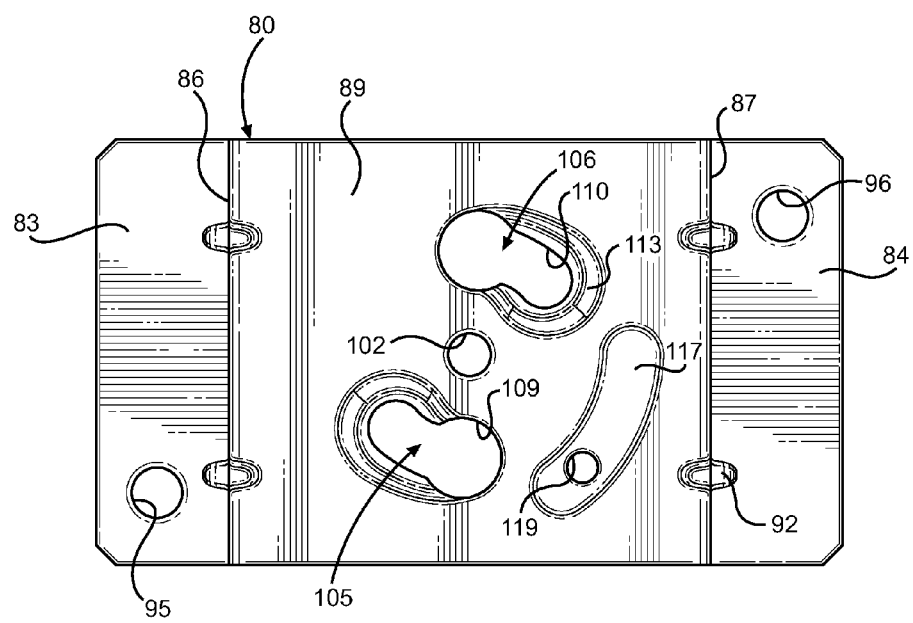
FIG. 3 is a top view of the bracket of FIG. 2.

With reference to an embodiment of the invention shown in FIGS. 2 and 3, the turn and lock mechanism 70 includes a support member in the form of a bracket 80 having base flanges 83 and 84. Projecting from base flanges 83 and 84 are upstanding legs 86 and 87 respectively. Upstanding legs 86 and 87 are interconnected by an upper cross plate 89. As shown in these figures, various internal gusset supports, such as that indicated at 92, can be provided between the base flanges 83 and 84 and upstanding legs 86 and 87, as well as between upstanding legs 86 and 87 and cross plate 89. Each of the base flanges 83 and 84 is preferably formed with at least one aperture 95, 96 for securing bracket 80 to structure below range top 8, such as a burner box indicated at 99 in FIG. 2.

As also shown in these figures, bracket 80 includes a locator opening 102 which is shown to be centrally located in cross plate 89. Radially spaced from locator opening 102 is a pair of arcuate slots 105 and 106, with each slot 105, 106 including an enlarged diametric portion 109 and a smaller or reduced diametric portion 110. About reduced diametric portion 110, cross plate 89 is formed with a concave wall 113 which, as indicated in these figures, extends completely about reduced diametric portion 110 and tapers into enlarged diametric portion 109. Also arranged along cross plate 89, at a location spaced from arcuate slots 105 and 106 as well as locator opening 102, is an arcuate recess 117. Provided within arcuate recess 117 is a lock opening 119.

Figure 4:
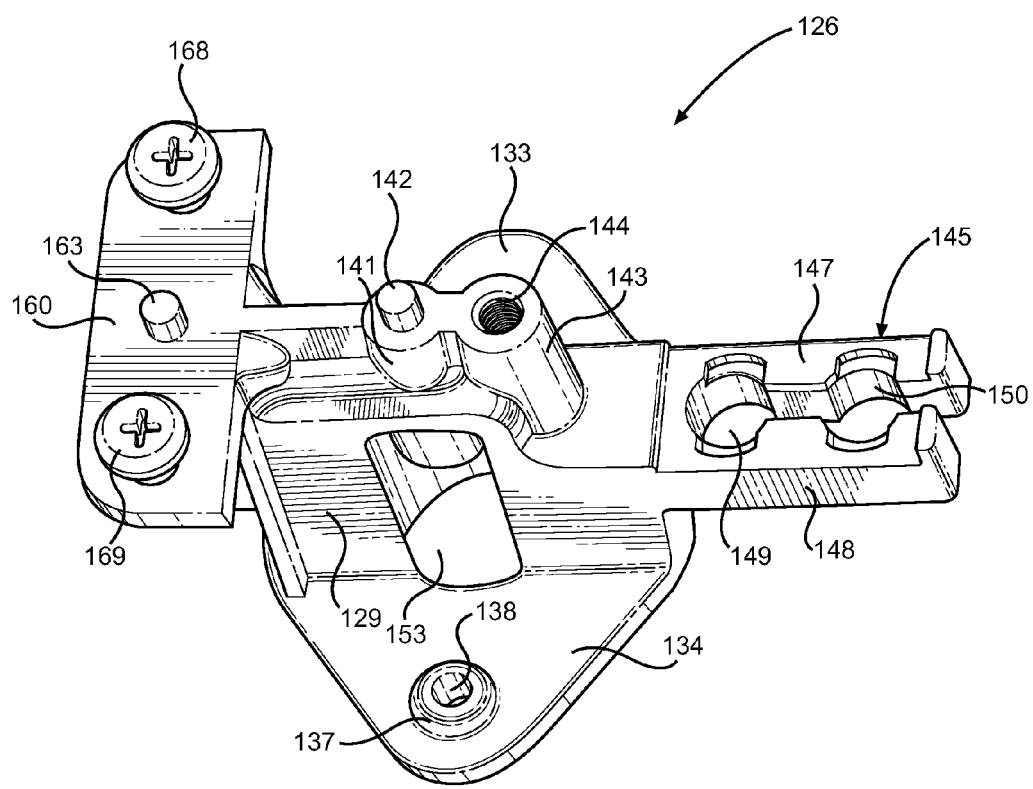
FIG. 4 is a perspective view of a holder of the mounting system of the invention.

As will be detailed more fully below, locator opening 102, arcuate slots 105 and 106, arcuate recess 117 and lock opening 119 are used in mounting a respective burner 11-15 to range top 8 in conjunction with a holder 126 which will now be described in detail with reference to FIG. 4. As illustrated, holder 126 includes a main body portion 129 from which project a pair of side flanges 133 and 134. Each side flange 133, 134 is provided with an associated mounting boss 137 having a bore 138. Main body portion 129 also includes a central boss 141 which terminates in a locking member 142. Adjacent locking member 142 is a further mounting boss 143 including a through hole 144. As will be more detailed more fully below, the mounting bosses 137 in the side flanges 133 and 134, as well as the mounting boss 143, are used to attach a respective burner 11-15 to holder 126. Depending upon the size of the burner 11-15, mechanical fasteners (not shown) are provided to extend through at least the bore 138 of each mounting boss 137 and, typically for larger size burners such as burner 12, an additional mechanical fastener (not shown) also extends within through hole 144 of mounting boss 143 such that the respective burner 11-15 is fixedly secured to holder 126.

Extending from main body portion 129 of holder 126 is a cantilevered extension 145. As shown, extension 145 is split or bifricated so as to define arms 147 and 148. Between arms 147 and 148 are established mounting ports 149 and 150. Although not shown in this figure, ports 149 and 150 are utilized to secure one or more igniters for the respective gas burner 11-15 secured to holder 126.

As also shown in this figure, holder 126 is formed with central port 153 extending into main body portion 129 between side flanges 133 and 134. Central port 153 is configured to receive gas supply line 72. In addition, holder 126 includes a wing 160 extending from main body portion 129. Wing 160 has extending therefrom a locating element 163 and, spaced from locating element 163, is provided a pair of projections 168 and 169. In the embodiment illustrated, projections 168 and 169 are established by mechanical fasteners secured to wing 160. However, as holder 126 is preferably molded of plastic, it is equally possible to integrally form projections 168 and 169 as molded geometry of holder 126.

Figure 5:
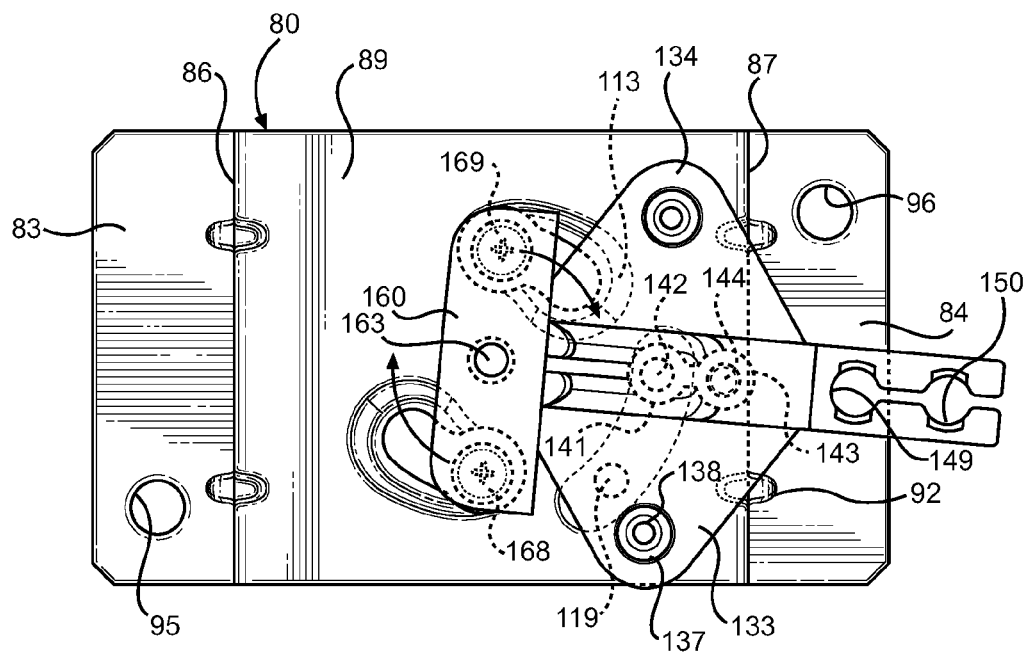
FIG. 5 is a top view showing an initial mounting position of the holder of FIG. 4 on the bracket of FIG. 3.

As indicated above, bracket 80 and holder 126 combine to establish turn and lock mechanism 70 and are used in combination to mount a respective one of burners 11-15 to range top 8. This overall mounting arrangement is designed to minimize the labor associated with mounting burners 11-15 and to establish a mounting system which will not only enable technicians to readily remove a given burner 11-15 from range top 8 for servicing purposes but also ease in overall assembly process during the manufacture of cooking appliance 2. With this in mind, reference will be made to FIGS. 5 and 6 in describing the interaction between bracket 80 and holder 126 when mounting a given burner 11-15. With initial reference to FIG. 5, holder 126 is initially positioned upon bracket 80 such that locating element 163 is received within locator opening 102, while projections 168 and 169 are received within a respective enlarged diametric portion 109 of a respective arcuate slot 105, 106. At this point, it should initially be recognized that one of burners 11-15 would first be mounted to holder 126 in the manner described above prior to mounting holder 126 on bracket 80. The particular burner 11-15 has not been shown in these figures for clarity purposes and to enable better characterization of the turn and lock mechanism of the invention. In any case, along with locating element 163 being received within locator opening 102, locking member 142 also becomes positioned within arcuate recess 117.

Figure 6:
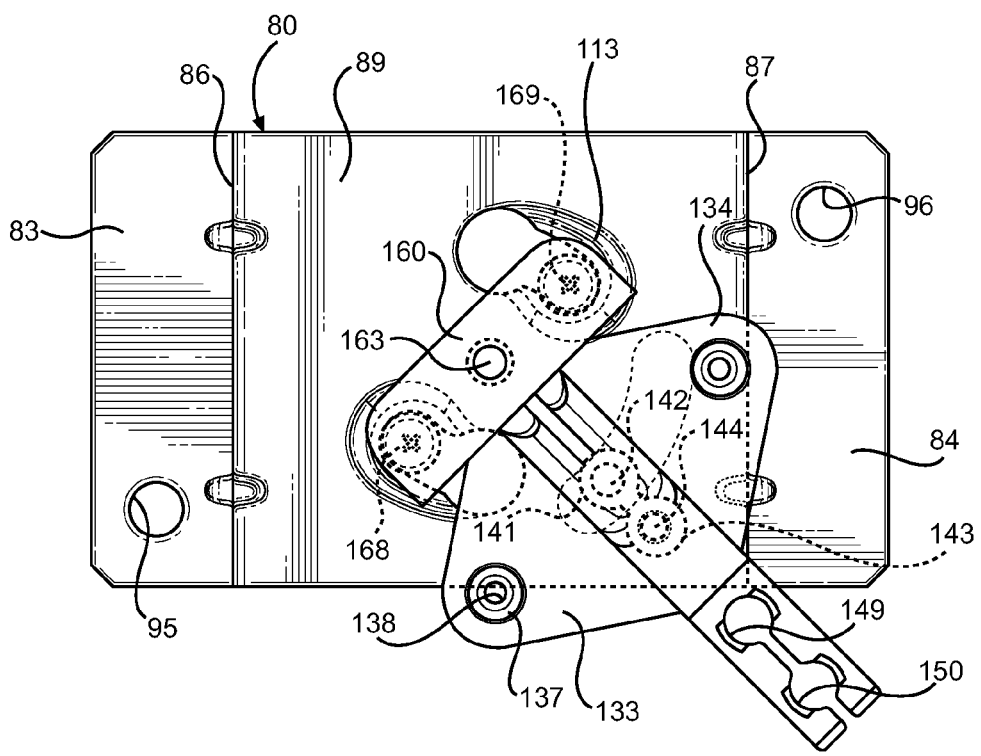
FIG. 6 is a top view showing the mounting of the holder in an operational or locked position upon the bracket of FIG. 3.

Once in the configuration described above, holder 126 can be rotated relative to bracket 80, with locating element 163 establishing a rotational axis for holder 126. Therefore, with locating element 163 rotating within locator opening 102, projections 168 and 169 will be led from the enlarged diametric portion 109 to the reduced diametric portion 110 of a respective arcuate slot 105, 106. As projections 168 and 169 move toward a respective reduced diametric portion 110, an engagement is made between each projection 168 and 169 and a respective concave wall 113 which causes holder 126 to actually be drawn against bracket 80. At the same time, locking member 142 will shift within arcuate recess 117 toward lock opening 119. Continued rotation of holder 126 causes projections 168 and 169 to be fully positioned and retained within a respective reduced diametric portion 110, at which point lock element 142 reaches and extends into lock opening 119 as illustrated in FIG. 6.

Based on the above, it should be readily apparent that the cooktop burner mounting system of the invention enables a gas burner, as well as its associated gas supply line, to be mounted to a cooktop with a minimal amount of labor, yet establishes a reliable connection while enabling the burner to be conveniently removed for replacement or other purposes. Although described with respect to preferred embodiments of the invention, it should be readily apparent that various changes and/or modifications can be made to the invention without departing from the spirit thereof. For instance, it should be noted that, although the invention has been described in connection with mounting burners to a range top, the invention is equally applicable for use in mounting burners to support structure fixed below any type of cooktop. In addition, it should be recognized that some or all of the interengaging elements between the support structure and the holder could be reversed. For example, the locking member and locating element could be provided on the support structure and be received in openings provided in the holder while still performing the desired turn and lock functions. Furthermore, although a separate bracket mounted to a burner box has been illustrated for purposes describing the invention, the support structure could take other forms. In particular, the bracket need not be formed as a separate element but could be integrated into the burner box itself such that the burner box actually establishes the bracket and the holder is mounted directly onto the burner box. Alternatively, other support structure, such as cross rails, could be utilized, particularly if a hard tool burner box is not employed. Therefore, it is simply important to note that the mounting system of the invention includes support structure fixed below a cooktop. In any event, the invention is only intended to be limited by the scope of the following claims.

We claim:

1. A gas cooking appliance comprising:
   a cooktop;
   a burner box arranged below the cooktop;
   a plurality of gas burners arranged about the cooktop;
   a bracket arranged below the cooktop and mounted to the burner box;
   a holder interposed between the bracket and at least one of the plurality of gas burners;
   a turn and lock mechanism for mounting at least one of the plurality of gas burners to the burner box, said turn and lock mechanism fixing the holder to the bracket, wherein the turn and lock mechanism includes interengaging structure for initially attaching the holder to the bracket and, upon twisting the holder relative to the bracket, securing the holder upon the bracket, wherein the turn and lock mechanism includes a pair of spaced, arcuate slots formed in the bracket, with each slot having an enlarged diametric portion and a smaller diametric portion, and wherein the holder is provided with at least two spaced projections, with each projection being sized so as to be receivable in a respective said enlarged diametric portion and retained in a respective said smaller diametric portion upon twisting the holder relative to the bracket; and
   locking structure retaining the holder in a desired, operational position after the holder is twisted relative to the bracket, wherein the locking structure includes a locking member which is initially outside the bracket when the at least two spaced projections are received in the enlarged diametric portions and only received in an opening formed in the bracket upon rotation of the holder to the operational position.

2. The gas cooking appliance according to claim 1, wherein the projections are established by either fasteners extending from the holder or molded geometry on the holder.

3. The gas cooking appliance according to claim 1, further comprising: locating structure provided between the holder and the bracket to assure proper alignment of the turn and lock mechanism.

4. The gas cooking appliance according to claim 3, wherein the locating structure is constituted by a locator element which extends from the holder into an opening in the bracket, with the locator element establishing a rotational axis for the holder.

5. The gas cooking appliance according to claim 1, wherein the locking structure is configured such that, when the at least two spaced projections are received in the enlarged diametric portions, the locking member is not received in the opening and, when the at least two spaced projections are retained in the smaller diametric portions, the locking member is received in the opening.

6. The gas cooking appliance according to claim 5, further comprising an arcuate recess, wherein the opening is located within the arcuate recess.

7. The gas cooking appliance according to claim 6, wherein the locking structure is configured such that, when the at least two spaced projections are received in the enlarged diametric portions, the locking member is positioned within the arcuate recess and, as the holder is twisted relative to the bracket, the locking member shifts within the arcuate recess until reaching and extending into the opening.

8. A cooking appliance comprising:
   a cooktop having at least one opening for a gas burner;
   a support member fixedly mounted below the cooktop, said support member including a pair of spaced, arcuate slots each having an enlarged diametric portion and a smaller diametric portion;
   a gas burner;
   a holder for the gas burner, said holder including:
      at least two spaced projections, with each projection being sized so as to be receivable in the enlarged diametric portion of the support member prior to twisting of the holder relative to the support member and retained in the smaller diametric portion after twisting of the holder relative to the support member;
      locating structure provided on the holder and adapted to assure proper alignment of the holder relative to the support member; and
      locking structure for retaining the holder in a desired, operational position after the holder is twisted relative to the support member, wherein the locking structure includes a locking member adapted to be received in an opening formed in the support member upon rotation of the holder to the operational position; and
   an arcuate recess, wherein the opening is located within the arcuate recess, and wherein the locking structure is configured such that, when the at least two spaced projections are received in the enlarged diametric portions, the locking member is positioned within the arcuate recess and, as the holder is twisted relative to the support member, the locking member shifts within the arcuate recess until reaching and extending into the opening.

9. The cooking appliance according to claim 8, wherein the projections are established by either fasteners extending from the holder or molded geometry on the holder.

10. The cooking appliance according to claim 8, wherein the locating structure is constituted by a locator element adapted to project into an opening in the support member, with the locator element establishing a rotational axis for the holder.

11. The cooking appliance according to claim 8, wherein the locking structure is configured such that, when the at least two spaced projections are received in the enlarged diametric portions, the locking member is not received in the opening and, when the at least two spaced projections are retained in the smaller diametric portions, the locking member is received in the opening.

12. A method of mounting a gas burner relative to a cooktop of a cooking appliance comprising:
fixedly attaching the gas burner to a holder, said holder including a pair of spaced projections;
interengaging the holder with a support member arranged below the cooktop, said support member including a pair of spaced, arcuate slots each having an enlarged diametric portion and a smaller diametric portion, with each projection of the holder being received in a respective enlarged diametric portion of the support member;
after interengaging the holder with the support member, twisting the holder relative to the support member to position the gas burner in an operational position, with each projection of the holder being retained in a respective smaller diametric portion of the support member; and
locking the holder relative to the support member in the operational position, wherein locking the holder is constituted by receiving a locking member projecting from the holder in an opening formed in the support member upon rotation of the holder to the operational position, and wherein the locking member is initially outside the support member when the pair of spaced projections is received in the enlarged diametric portions and only received in the opening upon rotation of the holder to the operational position.

13. The method of claim 12, further comprising: locating the holder relative to the support member to assure proper alignment of the holder relative to the support member and establish a rotational axis, wherein the holder is twisted about the rotational axis.

14. The method of claim 12, wherein, when the pair of spaced projections is received in the enlarged diametric portions, the locking member is not received in the opening and, when the pair of spaced projections is retained in the smaller diametric portions, the locking member is received in the opening.

15. The method of claim 14, wherein the opening is located within an arcuate recess, and receiving the locking member in the opening includes receiving the locking member in the opening in the arcuate recess.

16. The method of claim 15, wherein, when the pair of spaced projections is received in the enlarged diametric portions, the locking member is positioned within the arcuate recess and, as the holder is twisted relative to the support member, the locking member shifts within the arcuate recess until reaching and extending into the opening.

\* \* \* \* \*